No. 715,270.  
W. E. KARNS.  
NUT LOCK.  
(Application filed July 15, 1902.)  
(No Model.)

Patented Dec. 3, 1902.

Witnesses  
T. L. Mochean  
W. U. Deane.

Inventor  
William E. Karns,  
by D. T. Walhaupter  
Attorney

THE NORRIS PETERS CO., PHOTO-LITHO., WASHINGTON, D. C.

UNITED STATES PATENT OFFICE.

WILLIAM ELLIOTT KARNS, OF PARKERS LANDING, PENNSYLVANIA.

NUT-LOCK.

SPECIFICATION forming part of Letters Patent No. 715,270, dated December 9, 1902.

Application filed July 15, 1902. Serial No. 115,662. (No model.)

*To all whom it may concern:*

Be it known that I, WILLIAM ELLIOTT KARNS, a citizen of the United States, residing at Parkers Landing, in the county of Armstrong and State of Pennsylvania, have invented certain new and useful Improvements in Nut-Locks, of which the following is a specification.

This invention relates to an improvement in nut-locks, and has special reference to improved locking means associated with the bolt and nut to provide a positive and reliable lock for securely fastening the nut and effectually preventing the same from turning or working loose.

In the accomplishment of the above object the invention has in view a nut-lock device involving no special change in the original form and construction of the bolt and nut, while at the same time comprising means for effecting a permanent and rigid locking of the nut upon the bolt when the former has been turned as tightly as desired.

A further object of the invention is to provide for effecting a locking action of the nut upon the bolt through the medium of a key acting to crush the threads by pressure exerted in a radial direction upon the key, and therefore constituting an improvement in that type of nut-locks known as the "thread-lock."

The invention also contemplates a nut-lock capable of general application to bolts and nuts irrespective of their use, but possessing special utility in connection with nuts subject to constant vibration and a tendency to loosen—as, for instance, in machinery and railway-fastenings.

With these and many other objects in view, which will more readily appear as the nature of the invention is better understood, the same consists in the novel construction, combination, and arrangement of parts, as will be hereinafter more fully described, illustrated, and claimed.

The essential feature of the improvement involved in the form of a key and the means for wedging and holding the same in place are necessarily susceptible to modification; but a preferred embodiment of the invention is shown in the accompanying drawings, in which—

Figure 1:
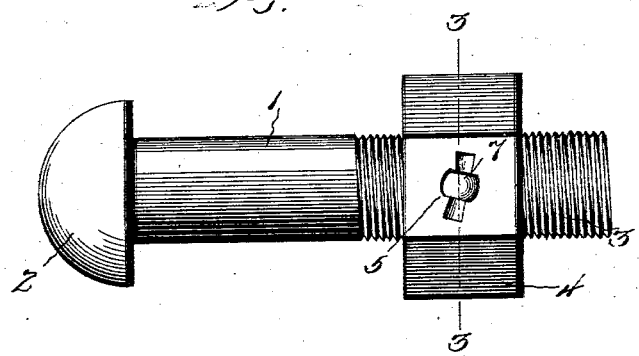
Figure 2:
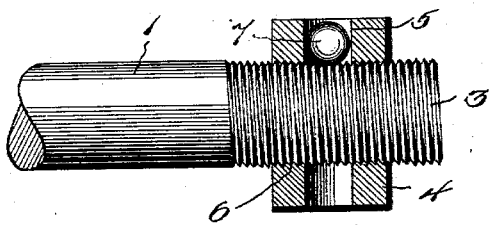
Figures 3, 4:
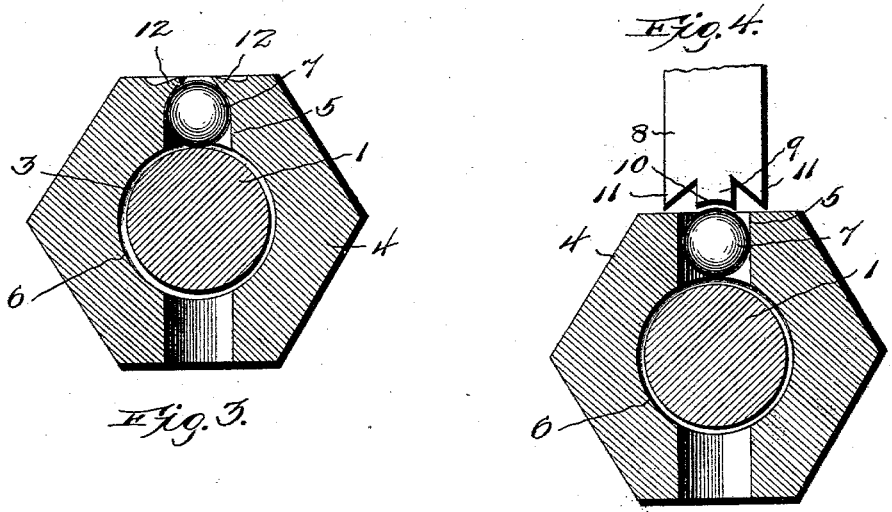

Figure 1 is an elevation of an ordinary railway-joint bolt and nut embodying the improvement contemplated by the present invention. Fig. 2 is a detail longitudinal sectional view of a portion of the bolt, the line of section including the spherical locking key or ball. Fig. 3 is a transverse sectional view on the line 3 3 of Fig. 1. Fig. 4 is a detail transverse sectional view in the same plane as Fig. 3, but illustrating the parts in their unlocked relation prior to the upsetting of the holding-wedges for the key or ball, the view also including a form of swaging set or tool that may be advantageously employed to drive the ball into and against the threads simultaneously with the upsetting of the holding-wedges against the ball.

Like reference-numerals designate corresponding parts in the several figures of the drawings.

In carrying out the invention the elements constituting the nut-lock may be associated with a bolt and nut used in any position and for any purpose; but for illustrative purposes to emphasize the utility of the invention it is deemed sufficient to show the lock as applied to a bolt and nut such as employed for railway-joint fastenings.

Referring particularly to the drawings, the numeral 1 designates the bolt, having the head 2 and the usual threaded portion 3, which accommodates thereon the nut 4. The nut 4 may be of the polygonal form or, in fact, of any shape without affecting the invention, as it is only essential to the successful carrying out of the same that the nut be provided in the side thereof with a radially-disposed keyhole 5. The radially-disposed keyhole 5 may be formed in the side of the nut by punching, drilling, or in any other convenient way; but irrespective of how the said hole is formed the same entirely pierces the nut and intersects the threaded bore 6 thereof. The radially-disposed keyhole 5, piercing the side of the nut, is preferably of circular form, and prior to the locking of the nut upon the bolt the hole is of uniform size throughout and is designed to loosely and freely receive therein a spherical locking key or ball 7.

The spherical locking-key 7 is preferably a hardened-steel ball, which retains its form and rigidity even when driven with crushing force against and into the threads of the bolt 1. A locking action is accomplished by such force being applied to the spherical key or ball 7 after the same has been inserted in the hole 5. While various expedients may be resorted to for applying the force or pressure to the key or ball 7 in a radial direction, this is preferably accomplished by the employment of a swaging set or tool of proper form. A preferred and practical type of swaging set or tool is illustrated in Fig. 4 of the drawings and essentially comprises a shank or stem portion 8, provided at its active end with a centrally-disposed ball-setting head 9, having a curved seat portion 10 fitting the ball, and also, respectively at opposite sides of the central head 9, with the angular downwardly-divergent swaging-lips 11, adapted to engage the surface of the nut at opposite edges of the hole or orifice 5.

By reason of the employment of a tool of the character described and illustrated it will be obvious that when the same is struck a strong blow it performs a dual function—namely, to force the ball against and into the threads and also to swage against and upon opposite sides of the ball the upset holding-wedges 12, which are swaged or upset from the metal of the nut-body.

The upset holding-wedges 12 of the nut-body are necessarily located at the outer end of the keyhole or orifice, and hence not only constitute an effective holding means for rigidly retaining the spherical key or ball in its locked position, but also during the process of swaging exert a strong wedging action upon the opposite sides of the ball, which is exerted in direction of its pressure against and into the threads, thus materially adding to the direct pressure of the radial blow directed against the ball and closely following up the movement of the ball, so as to prevent the slightest rebound or loosening from the threads against which it crushes.

From the foregoing it will be obvious that irrespective of the form of tool that may be employed for swaging on the ball edges of the keyhole or orifice 5, upset wedge portions of the metal will necessarily be swaged against the ball to insure the locking and holding action just described, which is important to the successful carrying out of the invention.

From the foregoing it is thought that the construction, operation, and many advantages of the herein-described nut-lock will be readily apparent without further description, and it will also be understood that changes in the form, proportion, and minor details of construction may be resorted to without departing from the spirit of the invention or sacrificing any of the advantages thereof.

Having thus described the invention, what is claimed, and desired to be secured by Letters Patent, is—

1. In a nut-lock, the combination with the threaded bolt, of the nut having a radially-disposed keyhole or orifice, a spherical locking-ball confined within the keyhole or orifice and forced into the threads of the bolt, the body of the nut being provided with a portion or portions upset onto and bearing against the sphere or ball, said upset portion or portions comprising non-yielding means for holding the sphere or ball under stress in its forced position.

2. In a nut-lock, the combination with the threaded bolt, of the nut having a radially-disposed keyhole or orifice, and a steel ball confined within the keyhole or orifice and forced into the threads of the bolt, the body of the nut being provided at opposite points and at the outer end of the keyhole or orifice with inwardly-swaged upset holding-wedges bearing against the opposite curved surfaces of the sphere or ball and comprising means for holding the same under stress in its forced position.

In testimony whereof I affix my signature in presence of two witnesses.

WILLIAM ELLIOTT KARNS.

Witnesses:
  B. W. STOTT,
  C. B. HENRY.